Aug. 4, 1964     D. R. BIEGEL     3,143,288
SOURCE PUNCHING DEVICE

Filed Jan. 3, 1961     6 Sheets-Sheet 1

INVENTOR.
DONALD R. BIEGEL
BY
Miketta and Glenny
ATTORNEYS.

INVENTOR.
DONALD R. BIEGEL
BY
Miketta and Glenny
ATTORNEYS.

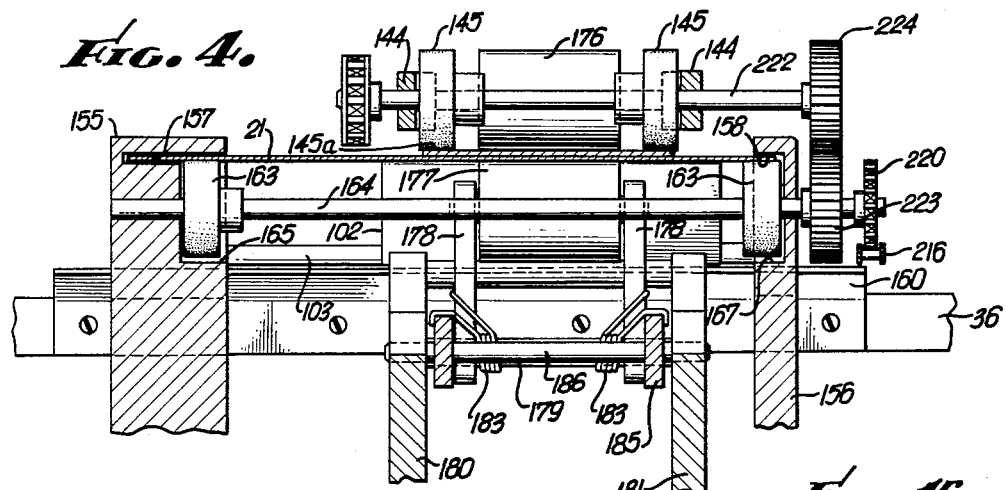
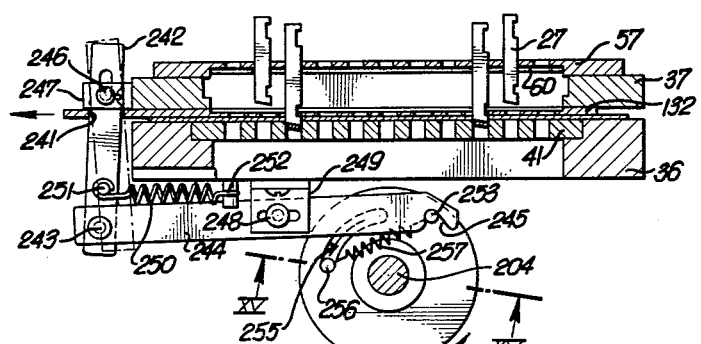
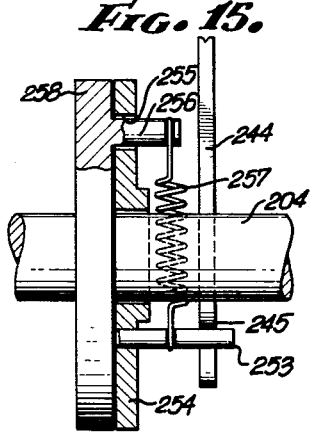
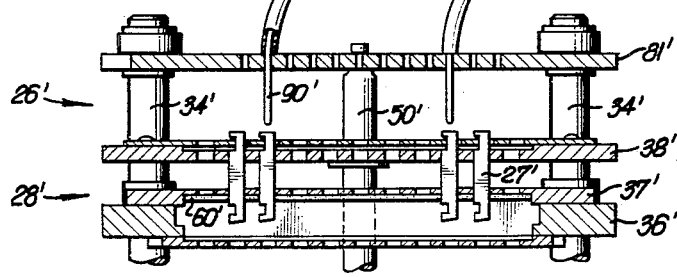
INVENTOR.
DONALD R. BIEGEL
BY Miketta and Glenny
ATTORNEYS.

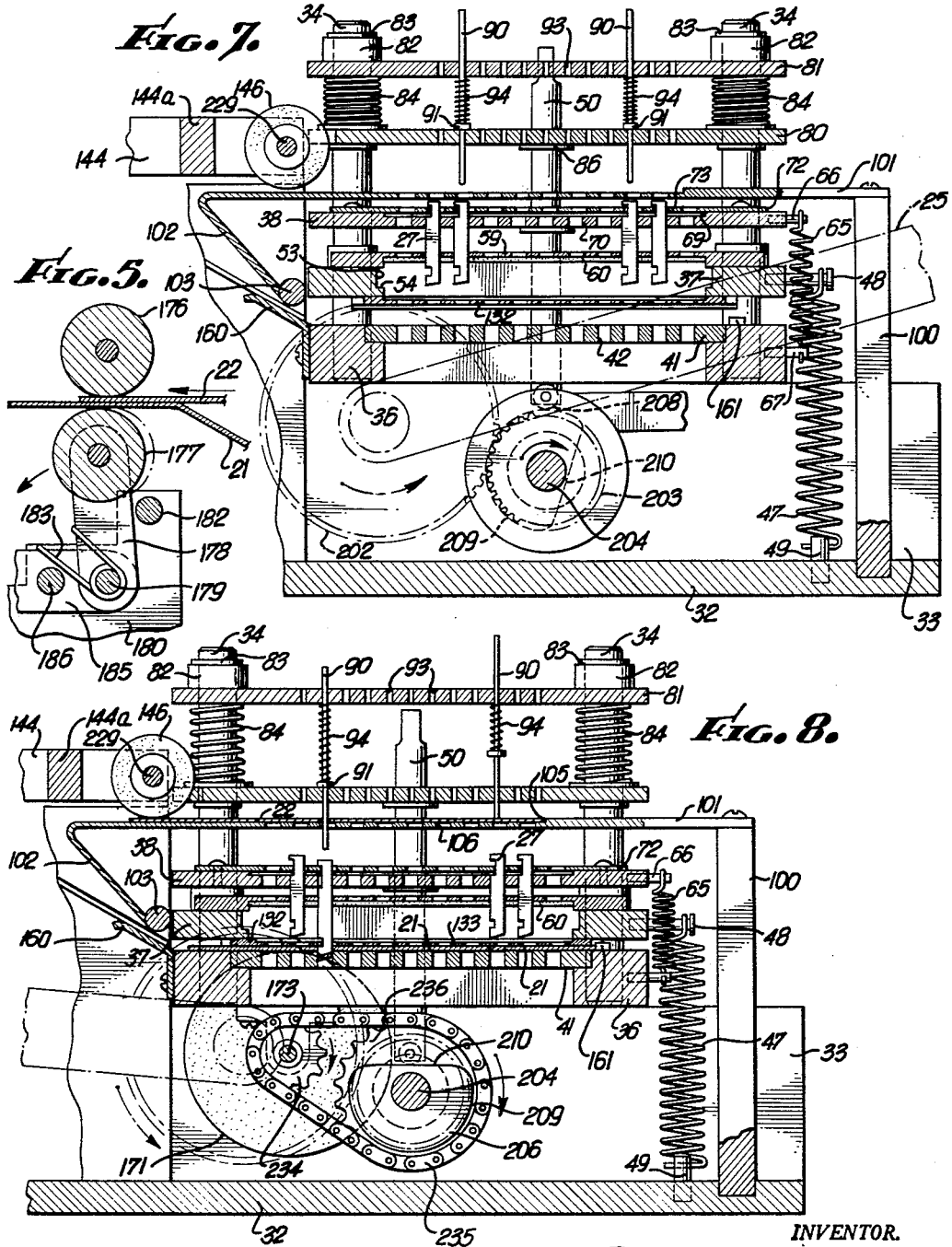

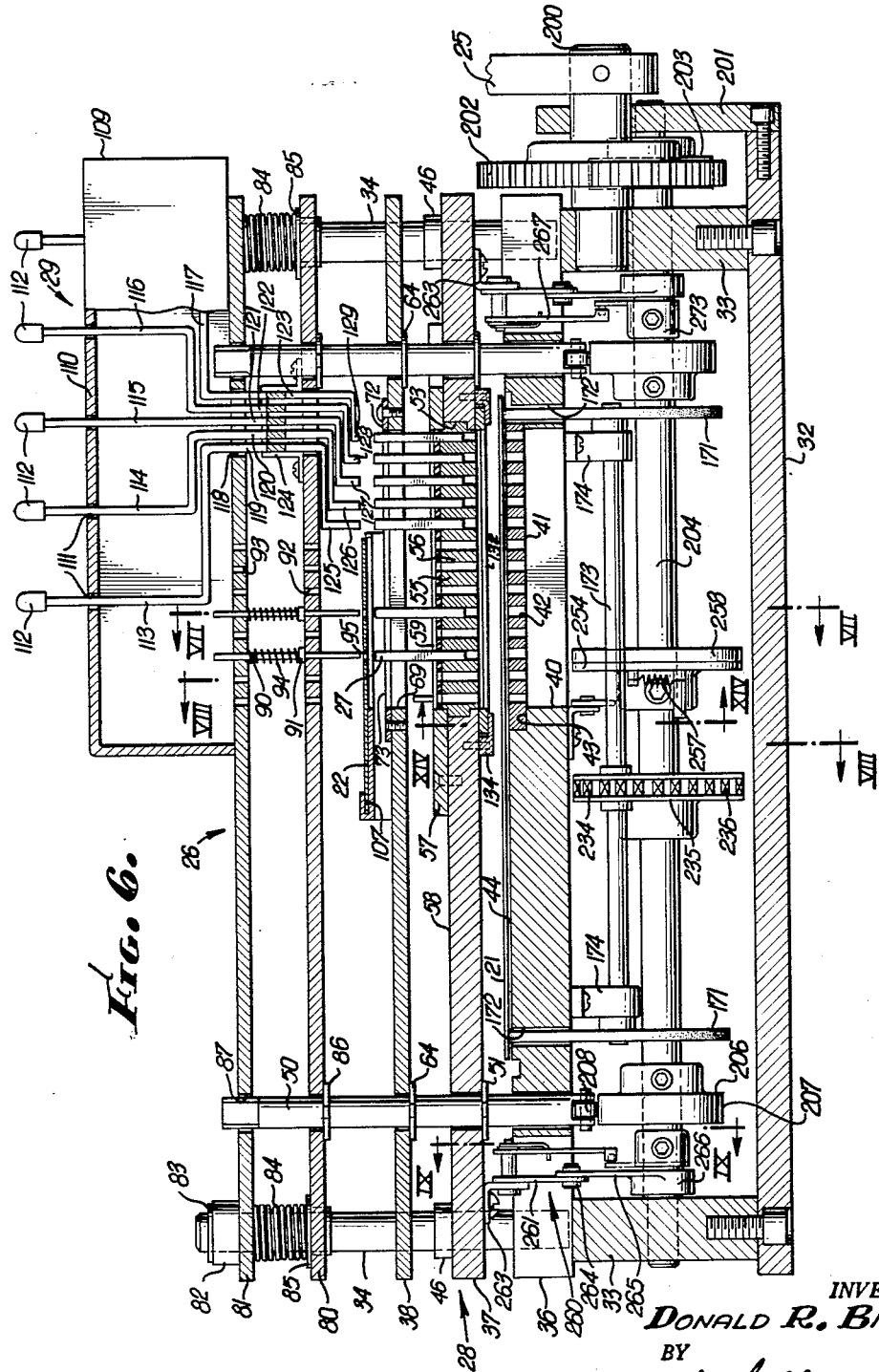

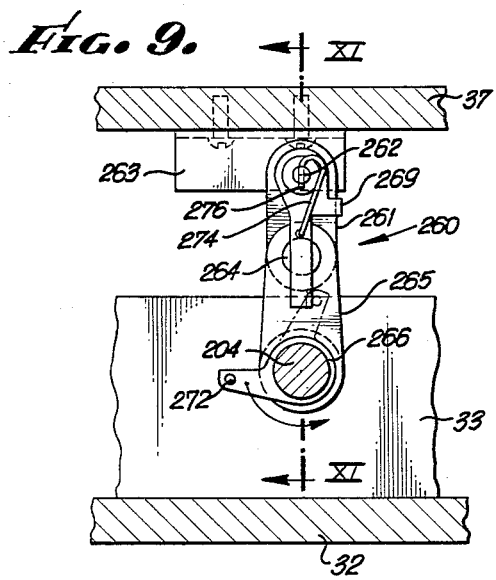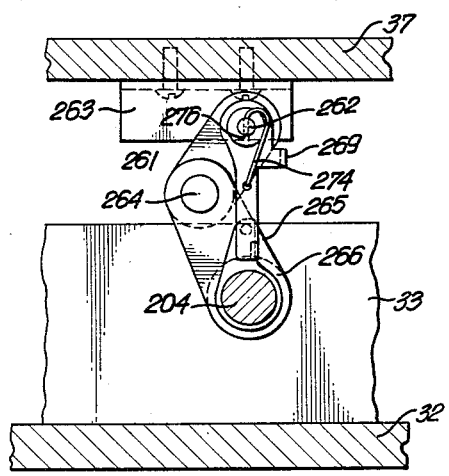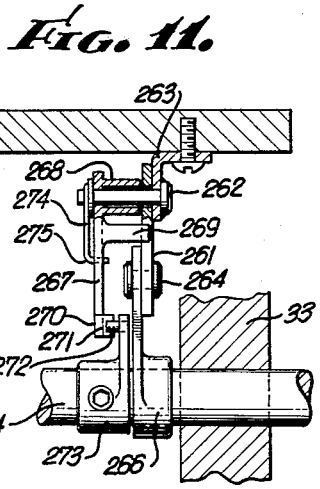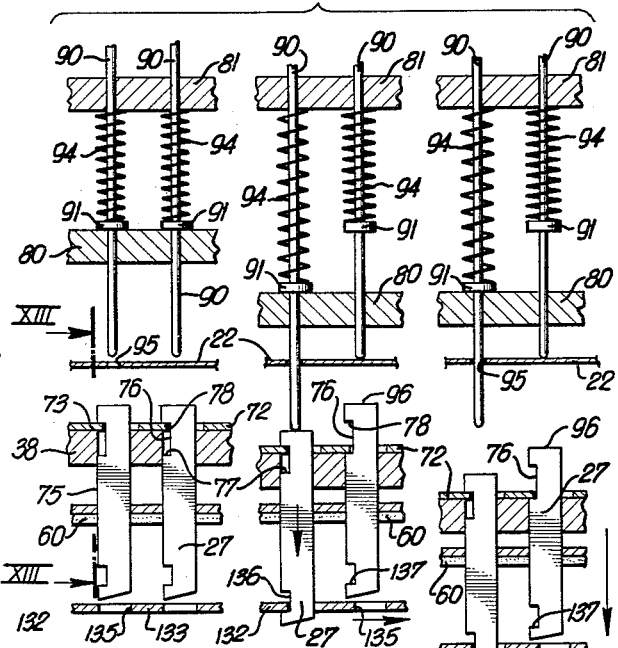

United States Patent Office 3,143,288
Patented Aug. 4, 1964

3,143,288
SOURCE PUNCHING DEVICE
Donald R. Biegel, North Hollywood, Calif., assignor, by mesne assignments, to Dashew Business Machines, Inc., Los Angeles, Calif., a corporation of California
Filed Jan. 3, 1961, Ser. No. 80,416
24 Claims. (Cl. 234—45)

This invention relates to a machine or device for transferring information in code form to a record means by selectively punching the latter, and in particular to a punch device adapted to be used at a station or place where a sale is made for transferring information in code on a credit card or the like to a sales slip, invoice, record or other data storage form or the like.

Credit cards have become widely and extensively used in merchandising of various products, as, for example, gasoline and consumer goods. Such credit cards usually have included the embossed name, address and account number of the owner so that such information may be printed on a sales slip when the credit card and sales slip are associated in a machine for this purpose.

To facilitate the rapid processing, recording, accounting and billing of the thousands of credit card transactions occurring each day, it has been found economically desirable to transfer as much information relating to a sales transaction as possible into coded form, that is, a physical arrangement of data or intelligence indicating means, adapted to be used and read by data processing machines such as various well known types of business machines. It will be apparent that the transfer of the embossed name, address and account number on a credit card to a sales slip does not provide such information in a form which can be readily used by modern accounting and business machines.

In the present invention, which is particularly described with respect to an exemplary source or station punch device but is not to be limited thereto, a credit card is provided with data or information thereon in embossed form; that is, printed name, address and account number of the owner; as well as in code form, in this example a selected arrangement of holes or perforations in the card at a selected location thereon. A sales slip to which data in both forms is to be transferred may be provided for the record or data storage means. The term sales slip as used herein refers to one or more punchable sheets or cards adapted to receive the data: one of these may be a receipt returned to the purchaser while another may eventually be sent to a central accounting office for processing by data processing machines. A device embodying the present invention is so constructed and arranged that both card and sales slip are introduced into the device simultaneously and accurately positioned therein, the data in code form is sensed by means responsive to the code, punch elements are selected in accordance with the code, and the sales slip is punched with the information in code on the card. The present exemplary device accomplishes such an operation through an actuating means which requires manual movement of an actuating handle through only substantially less than 180°, and through a plurality of punch elements limitedly movable and normally retained in non-punch position by friction means in frictional engagement with each punch element. The friction means also initially holds selected punch elements in punch position and while locking means therefor are actuated by the said actuating means. The present device also includes means for printing the embossed information on the sales slip as the card and sales slip are simultaneously fed to the device.

The primary object of this invention therefore is to provide a machine or device for transferring information in code to a record means wherein the device embodies novel features of construction and operation.

An object of the invention is to provide a punch machine or device adapted to facilitate the transfer of coded information from one information carrying means to another information carrying means in a simple, rapid, foolproof manner.

Another object of this invention is to provide a punch device for transferring information from a credit card to a sales slip which is relatively inexpensive to manufacture and which requires a minimum of maintenance.

A further object of the invention is to provide a punch device for the purposes described above which is simply operable and for which special training of an operator or sales clerk is substantially eliminated.

A more specific object of the invention is to provide a punch device for the purposes mentioned above wherein a plurality of punch elements are supported in the device in novel manner.

A still further object of the invention is to provide a source or station punch machine for use with a credit card and sales slip wherein the transfer of information may be accomplished by movement of a single lever or handle through an angle of slightly more than 90°.

A specific object of the invention is to provide a punch element of novel form and configuration for use in such a punch device.

The invention further contemplates a punch device wherein friction means are provided for normally retaining the punch elements in non-punch position and wherein said non-selected punch elements are frictionally held against movement during a punching operation.

A still further object of the invention is to disclose and provide a punch device as stated above wherein means are provided for locking selected punch elements in punching position and for immediately releasing the locked punch elements after the punching operation.

A further object is to provide a punch device which does not require the use of pre-slitted or pre-scored record forms or sales slips and thereby is capable of using any, all, and greater areas available on slips or records.

Generally speaking, the punch device of this invention includes a means for accurately positioning a credit card and a sales slip in predetermined relation to a plurality of punch elements. Means responsive to the coded information on a credit card are movable into engagement with punch elements to be selected in accordance with the coded information. In one example such responsive means may include a plurality of sensing pins supported from the punch device and adapted to be moved into cooperable relation with the credit card so that certain pins may be selected and urged into engagement with a corresponding punch element for positioning the punch element in punch position. In another example the responsive means may include movement of a pin by a solenoid means which is actuated by information fed to a data-reading device. In both examples, the punch elements selected are moved into punch position by said pins and means are provided for locking the selected punch elements in punch position for the punching operation. Non-selected punch elements are held against movement during the punching operation by friction means in frictional engagement with each punch element. Means are provided for simultaneously moving the selected punch elements into punch engagement with the sales slip. An important aspect of the invention is the simplicity and effectiveness of the entire punching operation from the insertion of the credit card and sales slip in the machine to the rejection thereof after the information in both forms has been transferred to the sales slip.

This entire operation is accomplished by an actuating means which requires movement of a handle in a continuous fashion in first one direction and then in the return direction and through an angle of slightly more than 90° and less than 180°.

Many other objects and advantages of this invention will be readily apparent from the following description of the drawings, in which exemplary embodiments of this invention are shown.

In the drawings:

FIG. 4 is a sectional view taken in the plane indicated by line IV—IV of FIG. 3;

FIG. 5 is a fragmentary sectional view taken in the same plane as that of FIG. 3 and illustrating ejection of a card and invoice from the machine;

FIG. 6 is a sectional view taken in the transverse plane indicated by line VI—VI of FIG. 1;

FIG. 7 is a fragmentary sectional view taken in the plane indicated by line VII—VII of FIG. 6;

FIG. 8 is a fragmentary sectional view taken in the plane indicated by line VIII—VIII of FIG. 6;

FIG. 9 is a fragmentary sectional view taken in the plane indicated by line IX—IX of FIG. 6;

FIG. 10 is a fragmentary sectional view taken in the same plane as that of FIG. 9;

FIG. 11 is a fragmentary sectional view taken in the plane indicated by line XI—XI of FIG. 9;

FIGS. 12A, B and C are fragmentary sectional views taken in the same plane as FIG. 7 to show in more detail the sequence of movement of the several parts during a punch operation;

FIG. 13 is a sectional view taken in the plane indicated by line XIII—XIII of FIG. 12;

FIG. 14 is a fragmentary sectional view taken in a vertical plane indicated by line XIV—XIV of FIG. 6;

FIG. 15 is a fragmentary sectional view taken in the plane indicated by line XV—XV of FIG. 14; and FIG. 16 is a fragmentary sectional view illustrating a different embodiment of the invention, the section being taken in a vertical plane similar to FIG. 7.

Figure 1:
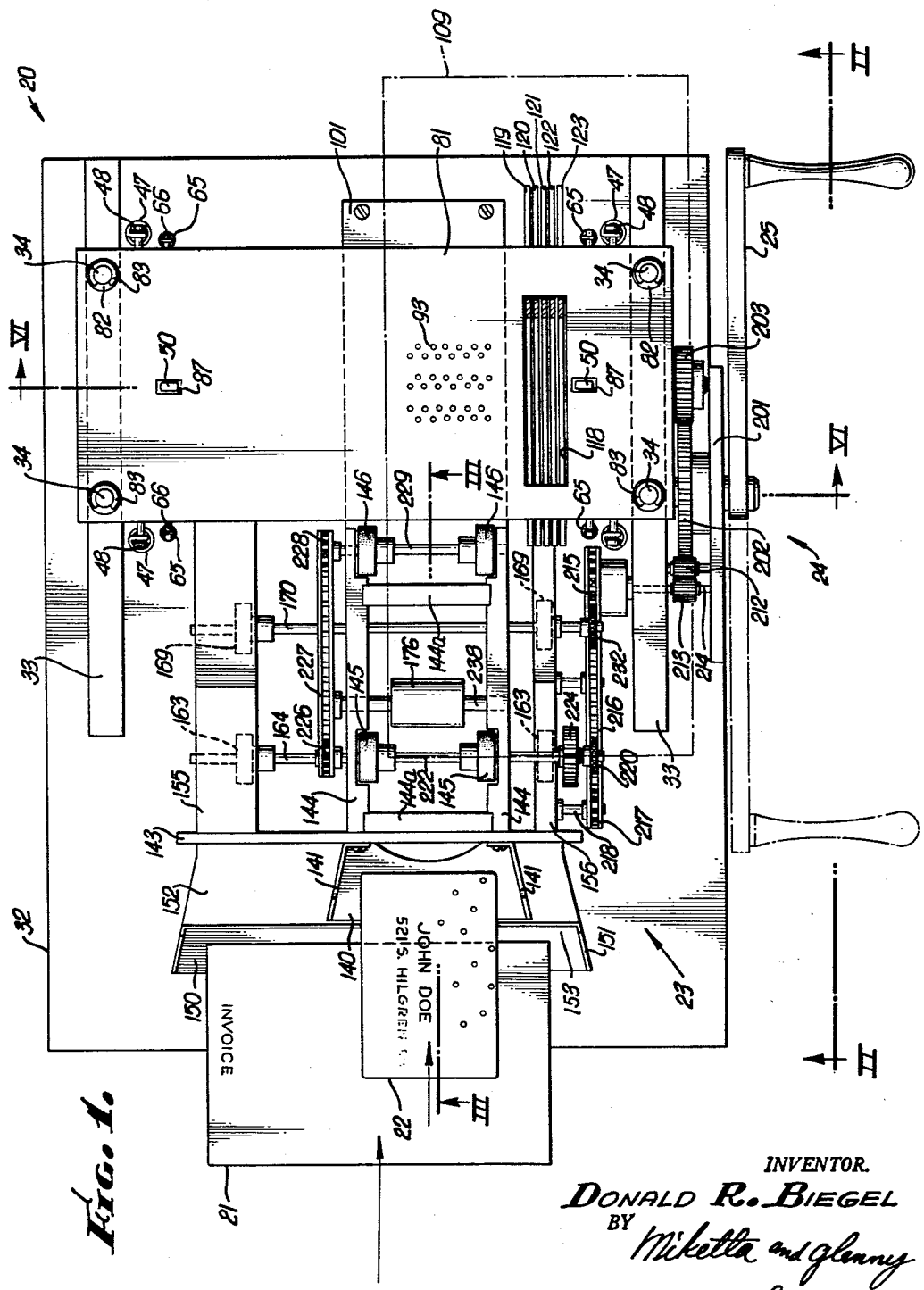
FIG. 1 is a top plan view of a machine or device embodying this invention.

An exemplary embodiment of this invention is shown in FIG. 1 and a punch machine or device generally indicated at 20 is adapted to be placed at a location for use by a sales clerk to record information including name, address, account number, amount of sale and other data concerning a sales transaction which may have been specified. An essential feature of device 20 is that the information is transferred to a sales slip 21 from a credit card 22 and is simultaneously converted to permanent usable machine language form which requires no further change. In addition, the sales slip may carry understandable writing placed thereon by a sales clerk and writing printed thereon by the device 20. The device 20 may be suitably located on a sales counter or the like.

In general, the sales slip 21 and the card 22 are fed to device 20 by a transport means 23 driven by actuating means 24 including an actuating or crank handle 25. Continuous movement of handle 25 from initial position, as shown in FIG. 1, to final position, as indicated in phantom lines, provides a sequence of operations whereby the sales slip 21 and card 22 are moved from the position shown in FIG. 1 by the transport means 23 into a predetermined position for transfer of data to the sales slip. Information-responsive means generally indicated at 26 cooperate with the card 22 to select certain punch elements 27 of punch means 28. Selected punch elements 27 are locked in place and are then driven into punching engagement with the sales slip 21. Such punching of the sales slip occurs just before the final position of the crank handle 25 and upon return of the crank handle 25 to its initial position the sequence of the above operation is generally reversed so that the selected punch elements are unlocked from punch position, the punch elements are moved into non-punch position, the information-responsive means is returned to normal position, and the sales slip and credit card are ejected from the punch device 20. A manually actuated data selection means generally indicated at 29 is provided for selecting punch elements to indicate the amount of the sale, as later described.

In detail, device 20 may comprise a frame means including a rectangular metal base plate 32 having secured thereto spaced, parallel upstanding side members 33 which may extend slightly more than half the length of base plate 32. Intermediate ends of each side member 33, a pair of upstanding spaced posts 34 are provided for guiding and positioning the punch means and the information-responsive means, said posts being laterally aligned.

Punch Means

Punch means 28 may comprise a female plate 36, a male guide plate 37 spaced above the female plate, and a punch strip plate 38 spaced above the male plate 37. All of plates 36, 37 and 38 may be of corresponding rectangular shape and engaged with the four posts 34 at respective ported corners of the plates. The female plate 36 serves as a die plate, is seated on the top edges of side members 33, and is secured in fixed stationary relation thereto by any suitable means. The female plate 36 may be provided with a rectangular opening 40 and a die insert plate 41 having a plurality of grid-like arranged, rectangularly shaped perforations 42 may be seated and secured on a rabbeted edge 43 provided around the top of opening 40. The top surface of the perforated insert die 41 may be flushed with the top surface 44 of plate 36 and upon these surfaces the sales slip 21 may be supported when in position to be punched.

The male plate 37 is vertically, slideably movable on the posts 34 and is limited in upward movement by a collar 46 carried on each post 34. The male plate 37 is biased downwardly toward the female plate 36 by a plurality of front and back biasing coil springs 47 (FIG. 1), each spring being secured at its top end to an outwardly projecting pin 48 carried by plate 37 and at its bottom end by an upstanding pin 49 (FIG. 7) carried by base plate 32. Springs 47 are made of relatively heavy spring stock and are of equal strength. Plate 37 is held against collar 46 and against the tension of the springs 47 by a pair of laterally spaced, reset shafts 50, each of which carries a lock ring 51 in engagement with the bottom face of plate 37. Reset shafts 50 are associated with the actuating means 24 and will be described hereafter.

The male plate 37 is provided with an opening 53 in which may be seated a punch element positioning member 55 on an internal peripheral recess 54. In this example, member 55 may include a plurality of parallel, spaced ribs 56, the spaces between said ribs 56 being aligned with rows of perforations 42 in the die member 41. A grid-like arrangement of perforations in the plate 37 may be provided by a top member 57 secured to the top surface 58 of plate 37 by suitable means and having a plurality of spaced, parallel ribs 59 extending across the member 55 in a direction transverse to the ribs 56. The grid-like arrangement of perforations may thus be readily provided and each perforation may be readily made to a pre-selected size of opening so as to slideably receive a punch element 27.

One of the important features of the present invention is the manner in which each punch element 27 is associated with the male plate 37 and retained in a selected position with respect thereto. In FIGS. 6, 7, 8 and 13 it should be noted that between the ribs 59 of the member 57 and the top surfaces of the ribs 56 of the member 55 a plurality of strips of friction material 60 extend in a front-to-back direction. As best seen in FIG. 6, the strips 60 of friction material are supported on top of the ribs 56 on the insert member 55 and are held there by the transversely extending ribs 59 of the member 57. Each strip 60 may be of any suitable friction material, preferably a synthetic material such as neoprene which has long-wearing qualities. As best seen in FIG. 13, adjacent strips 60 frictionally engage and grasp, as at 61, opposite sides of each punch element 27 and hold elements 27 against movement. The frictional forces exerted by the friction material on the elements 27 are not sufficient to prevent movement of an element 27 when selected for punching and are sufficient to retain non-selected elements against unwanted random movement during a punching operation. In this respect it will be understood that elements 27 may be so retained against movement and yet permitted selective movement by magnetization of each punch element, the magnetized element being held by the magnetic forces in selected position against contacting faces of the male plate 37 and the guide plate 38. The manner of retaining and holding the punch elements will be further understood in connection with the operation of the device.

Punch strip plate 38 is slideably mounted on the posts 34 and is supported in spaced relation to male plate 37 by a lock ring 64 on each reset shaft 50 and in contact with the bottom surface of plate 38. The punch strip plate 38 and the reset shaft 50 are biased downwardly toward the male plate 37 by a plurality of springs 65 (FIGS. 1 and 7) each supported at its top end by an outwardly projecting pin 66 carried by plate 38 and at its bottom end by an outwardly projecting pin 67 carried by female plate 36. Springs 65 are of relatively light weight as compared to springs 47 and are virtually equal in strength.

Strip plate 38 may be provided with an opening 69 corresponding to openings 40 and 53 and across said opening 69 may be provided a plurality of spaced parallel ribs 70. The spacing between ribs 70 corresponds generally to the spacing between the ribs 59 and is aligned therewith so that a punch element 27 may extend through the spacing between ribs 70 without contact therewith and then through the aligned perforations or spacings provided in plates 37 and 36.

Punch strip plate 38 also is provided with means for limiting vertical movement of the punch elements 27. Such means may include a member 72 secured to the top face of plate 38, said member 72 being provided with a plurality of parallel spaced transverse elements 73 which extend across opening 69 and as shown in FIGS. 7 and 8, are slightly offset with respect to the spaces between the ribs 70 of the strip plate 38.

In FIGS. 7, 8 and 12 the manner in which elements 73 cooperate with the punch elements 27 to carry said punch elements while providing limited vertical movement thereof is readily apparent. Each punch element 27 includes an elongated rectangular bar having a longitudinal edge face 75 provided at one end with a recess 76 formed in said face, said recess receiving a longitudinal edge margin of element 73. In non-punch position of element 27 the bottom face 77 of the recess 76 abuts element 73, while in punch position the top wall 78 of recess 76 abuts the upper surface of element 73. Thus each punch element 27 is permitted limited vertical movement for approximately the length of recess 76 relative to the guide plate 38. The top wall 78 serves as a stripping face for the punch element 27 to cause movement of the punch element from punch position into non-punch normal position, as later described.

*Information Responsive Means*

Means responsive to coded information carried by the credit card 22 may comprise a pair of vertically spaced sensing plates 80 and 81 corresponding in rectangular shape to the punch plates 36, 37 and 38 and mounted on the posts 34. Upper plate 81 is retained against upward movement by a collar 82 secured by a lock washer 83 provided on each post 34. Lower plate 80 is biased downwardly by a spring 84 ensleeved over each post 34 and normally held under compression between plates 81 and 80. A washer 85 may be provided for seating of spring 84 on plate 80. The lower plate 80 is supported in normal position, as shown in FIG. 6, by a lock washer 86 carried by each reset shaft 50. The upper end of each reset shaft 50 may project through a port 87 in the upper plate when the lower sensing plate 80 is in normal position.

The information-responsive means 26 may also include a plurality of selectively arranged sensing pins 90 (FIGS. 6, 7 and 12), each of said pins 90 being provided with a collar 91 seated on lower sensing plate 80. Each pin 90 has a top end extending through port 93 and above plate 81 and a bottom end extending through port 92 and below plate 80 and into slightly spaced relation with respect to the credit card 22. A spring 94 ensleeved over each pin 90 and seated between plate 81 and collar 91 biases each pin against plate 80. The bottom portion of each pin 90 may be cylindrical in form for passing through selectively arranged circular holes 95 provided in credit card 22 for abutting contact with the top face 96 of an aligned punch element 27. Sensing pins 90, which are not aligned with holes 95 in the credit card, will be blocked by the card from contact with punch elements 27. As noted in FIG. 1, the ports 92, 93 for the sensing pins 90 may be arranged in slightly staggered spaced relation so as to permit a maximum number of pins to be provided in a relatively small area. The arrangement of said pins 90 is correlated dimensionally with the coded holes 95 provided in the credit card so that registration and alignment of pins and holes is provided when the card is in position in device 20.

Means for supporting credit card 22 in a horizontal plane passing between the top edge faces 96 of punch elements 27 and the bottom end faces of the sensing pins 90 may include an upstanding back wall 100 secured in suitable manner to base 32 and having a width only partially the width of the base 32. The wall 100 supports a horizontal wall 101 which extends forwardly beyond the fixed female plate 36 and ends in a downwardly and rearwardly inclined return wall portion 102 which may be secured in suitable manner to a transversely extending rod 103 secured to forwardly extending intermediate walls 155, 156. The return portion 102 serves to guide the sales slip, as later described. The wall 101 may be provided with a transverse shoulder 105 which provides a back stop for limiting movement of card 22 and to longitudinally position said card over a plurality of perforations 106 provided in wall 101 in alignment with the punch elements 27. As shown in FIG. 6, one side of wall 101 may be provided with a guide groove or recess 107 for reception therein of an edge margin of card 22 to laterally position the card.

*Manual Data Selection Means*

Figure 2:
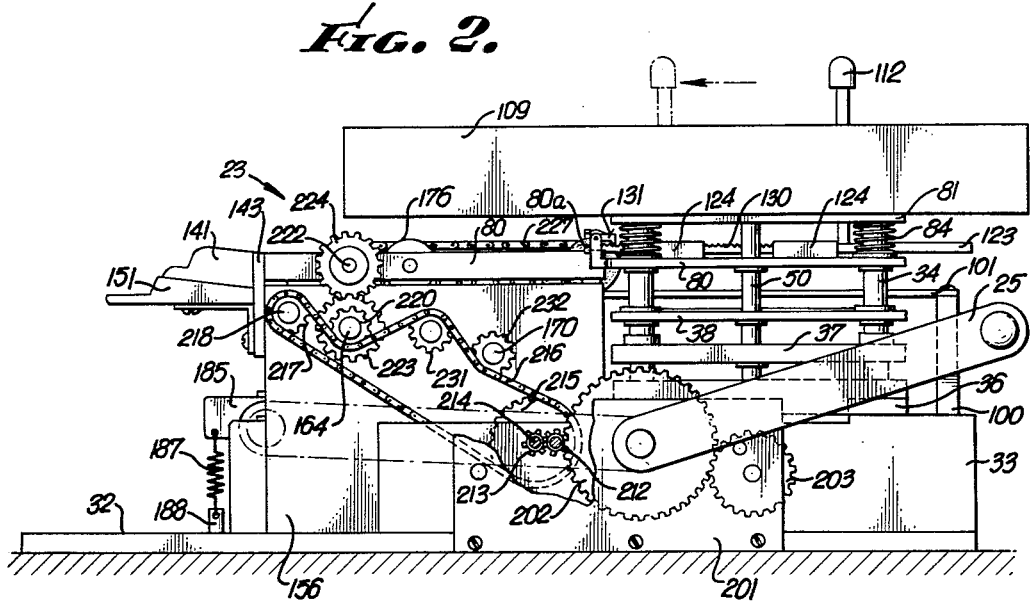
FIG. 2 is a side elevational view taken from the plane indicated by line II—II of FIG. 1.

Manual selection of punch elements 27 at five columns to the right of the location of the credit card may be best seen in FIGS. 1, 2 and 6. A housing 109 may be supported from upper sensing plate 81 over the five-column manual punch selection area. Top wall 110 of said housing may be provided with a corresponding number of longitudinally extending parallel slots 111 which slideably receive upstanding punch selector knobs 112. The top wall 110 may be provided with indicia opposite each slot 111 for indicating digits from 0 to 9 so that the amount of sale may be readily selected by moving the knobs opposite the selected indicia. The selector knobs 112 are connected to respective strip elements 113, 114, 115, 116 and 117 configured in any suitable manner so as to enter in close spaced relation and pass through a rectangular opening 118 provided in upper plate 81. Each of said elements 113–117 is connected to parallel, longitudinally extending, closely spaced punch selector bars 119–123 respectively, each of said rods being guided in longitudinally spaced brackets 124 provided with slotted walls to permit front and back movement of the selector knobs 112 to the desired indicia. The bars 119–123 are provided with punch element selector fingers 125–129 respectively, said fingers being positioned above punch elements 27 in the right five columns and arranged so that upon actuation of the device, after selection of the desired indicia, the selected fingers 125–129 will move downwardly simultaneously with the selected sensing pins 90 in order to urge selected punch elements 27 therebeneath into punch position.

Means to retain each of the bars 119–123 in selected position and against unwanted accidental movement (FIG. 2) may include ratchet teeth 130 formed in the top edge portion of each bar. A biased pawl or dog 131 pivotally mounted on a support element 80a carried by plate 80 releasably engages the teeth and prevents longitudinal movement of the bar except when force is applied to knob 112 to select the purchase amount.

Punch Element Lock Means

Means for locking punch elements 27 which have been moved downwardly by sensing pins 90 or fingers 125–129 into punch position so they will be held in fixed immovable relation with respect to the male punch plate 37 as it moves downwardly in a punching operation may comprise a locking plate 132 (FIGS. 6, 8 and 12) having spaced parallel locking strips 133 disposed in rows between punch elements 27. The locking plate 132 may be slideably supported from male plate 37 by a pair of parallel guides 134 secured to the bottom face of male plate 37 at opposite sides of opening 53. As best seen in FIG. 12, the locking plate 132 provides spaced openings 135 adapted to receive the lower end of punch elements 27, said openings being aligned therewith when the lock plate 132 is in unlocked position. After punch elements 27 are moved downwardly through the openings 135 and the actuating means moves the lock plate 132 rearwardly into lock position (FIG. 12b), lock strips 133 are received within a locking notch 136 in punch element 27, said notch defining a bottom wall providing a locking face 137 for abutting engagement with locking strip 133 during a punching operation. The manner in which the locking plate is moved into locked and unlocked position will be described hereinafter in connection with the actuating means.

Transport Means

Figure 3:
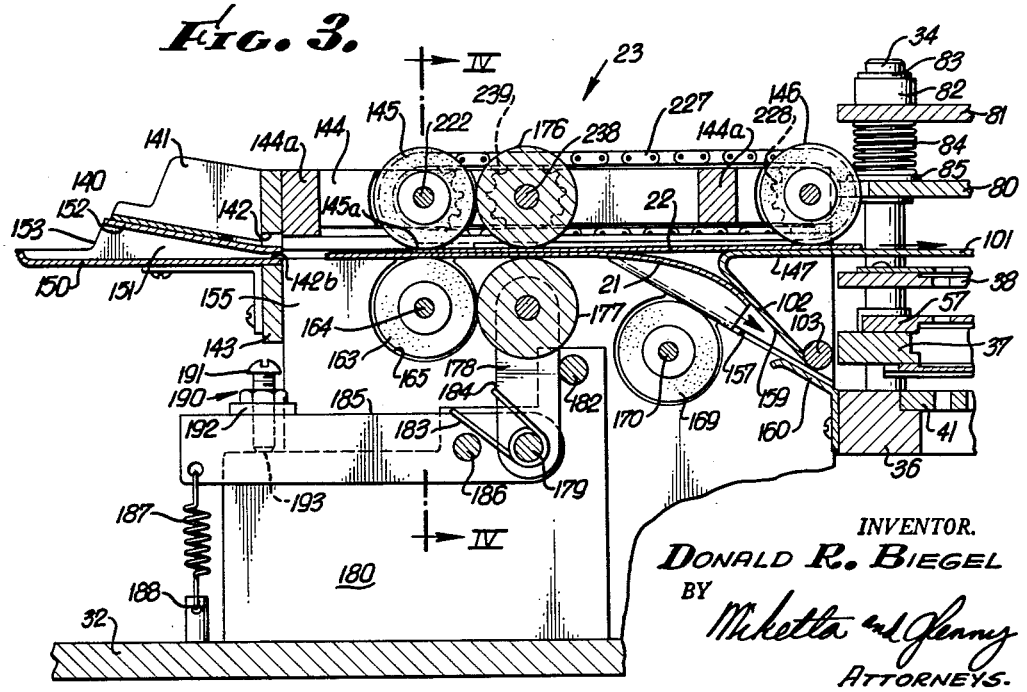
FIG. 3 is a fragmentary sectional view taken in the plane indicated by line III—III of FIG. 1.

Means for transporting the card 22 and sales slip 21 into the punch device and for ejection thereof therefrom may be best seen in FIGS. 1, 2 and 3. Means for initially placing and positioning card 22 may include a slightly inclined wall 140 and converging side walls 141 to direct card 22 through the upper portion of a lateral opening 142 provided in a front transverse wall 143 secured to front edge faces of walls 155, 156. Extending rearwardly from wall 143 may be parallel guide members 144 interconnected by transverse members 144a, said members 144 supporting a pair of friction drive wheels 145 adjacent opening 142. Drive wheels 145 frictionally contact, as at 145a, longitudinal edge margins of card 22. The guide members 144 also support in spaced relation to the front wheels 145, a pair of rear frictional drive wheels 146 disposed above front wall section 147 of wall 101 and cooperable therewith to advance a card into final position for a punching operation. The pair of wheels 146 are preferably slightly cocked to the left so that as a card 22 is propelled thereby into abutment with shoulder 105 (FIG. 8) the card 22 will be urged to the left and into abutment and alignment with the bottom surface of groove 107. Thus card 22 is accurately positioned by wheels 146. Overtravel of the wheels 146 is provided so that card 22 is positively positioned against shoulder 105.

The sales slip 21 may be positioned sidewise for acceptance by the transport means and a relatively wide platform 150 is provided forwardly of and supported by the front wall 143. Slightly converging side walls 151 and a top wall 152 interconnecting the same provide an opening at 153 (FIG. 3) for convenient reception of sales slip 21. The bottom portion 142b of opening 142 permits the sales slip to be introduced simultaneously and directly below credit card 22.

Means are provided for guiding the sales slip 21 in a path immediately below the path of the credit card and then downwardly into spaced relation with the credit card so the sales slip is positioned on top of the female plate 36. Such guide means may include the upstanding walls 155 and 156 supported and secured from base 32 in any suitable manner, said walls 155 and 156 being provided with aligned, inwardly facing grooves 157, 158 respectively adapted to slideably receive edge margins of sales slip 21. Adjacent the return portion 102 of wall 101 the grooves 157 and 158 are curved downwardly so as to guide the leading edge of the sales slip into contact with the downwardly inclined front surface 159 of wall 102. The sales slip is then guided beneath rod 103 and above a forwardly and upwardly inclined wall 160 secured to the female plate 36. As the sales slip is driven into final position on the female plate 36 abutment means 161 limits forward movement of the sales slip and longitudinally positions the sales slip.

Means for propelling sales slip 21 along its path may comprise a pair of front friction wheels 163 mounted on a transverse shaft 164 mounted in walls 155 and 156, said wheels being recieved in recesses 165 and 167 provided in said walls 155, 156 respectively. Forwardly of the inclined wall 102 and opposite the curved portions of guide grooves 157, 158 the sales slip 21 may be engaged by a pair of friction wheels 169 supported from a transverse shaft 170 suitably mounted in said walls 155, 156. As best seen in FIGS. 6 and 8, the sales slip 21 is driven into final position by a pair of friction wheels 171 having peripheral portions extending slightly above surface 44 on plate 36 and through slots 172 in plate 36. The friction wheels 171 are supported from a shaft 173 carried by brackets 174 secured to the bottom surface of female plate 36. Means for driving the shaft 173 will be described later.

Printing Means

Means for printing embossed information, such as the name, address and account number of the owner of the card, on the sales slip may be provided by a fixed upper roll 176 supported from walls 144 immediately behind the friction wheels 145 (FIGS. 3 and 5). The upper roll 176 presses the credit card into contact against the sales slip immediately therebeneath. An upwardly biased inking roll 177 vertically aligned with roll 176 engages the bottom surface of slip 21 for printing contact therewith. The inking roll 177 may be provided with a supply of ink in any well known manner and will reproduce by printing embossed indicia and symbols formed on card 21 on the bottom surface of sales slip 21. Inking roll 177 may be supported from a pair of upstanding links 178 pivotally connected to a shaft 179 pivotally mounted in upstanding spaced brackets 180 and 181 secured to base 32 between walls 155, 156. The links 178 are biased against a stop 182 carried by brackets 180, 181 by spring means 183 carried by shaft 179. One end of each spring 183 bears against its respective link 178 as at 184 and its other end bears against a horizontal member 185 pivoted about a connecting shaft 186 carried by brackets 180 and 181 forwardly of shaft 179. The front end of each member 185 may be connected to a biasing spring 187, the upper end of spring 187 being connected in suitable manner to the member 185 and the lower end of biasing spring 187 being connected as at 188 to a lug on base 32.

Springs 187 normally urge roller 177 upwardly. Adjustment screw means 190 are provided for regulating pressure contact of printing roll 177 with the sales slip, said adjustment screw means comprising a screw bolt 191 having threaded engagement with a horizontal lug 192 carried at the front end of each member 185 and overlying the top edge of associated wall 180 or 181. The bottom end of screw bolt 191 contacts at 193 the top surface of wall 180. A lock nut may be provided for adjustment screw 191. Thus the location of shaft 179 with respect to shaft 186 and the sales slip 21 may be accurately determined and secured.

Normally the printing roll 177 is in printing position with the upstanding links 178 against stop 182 and as the sales slip and credit card are passed thereover the print roll 177 prints the embossed information on the sales slip. When the sales slip and card are ejected from the machine, as seen in FIG. 5, the print roll 177 is permitted to move forwardly about its pivotal connection with shaft 179 and against the light biasing spring 183 to permit the printing roll 177 to move out of pressure printing contact with the sales slip 21.

*Actuating Means*

Actuating means 24 including crank handle 25 serves to actuate and drive in a selected sequence the transport means 23 including the printing means associated therewith, the information-responsive means 26 for selection of punch elements to be moved into punch position, the punch means 28 including the punch element lock means, and the ejection of the card and sales slip after the punching operation is complete. The sequence of the above several steps requires in the example of this invention movement of the handle 25 through a selected angle of slightly more than 90° and substantially less than 180°.

In detail, the actuating means 24 comprises handle 25 fixed on the end of a stub shaft 200 (FIGS. 1 and 6) which may be supported in suitable bearing mountings on one side member 33 and an outwardly spaced parallel upstanding wall 201. Between the walls 33 and 201 the stub shaft 200 may carry a drive gear 202 of relatively large diameter and in meshed engagement with a pinion gear 203 carried at one end of a single and the main cam shaft 204. The cam shaft extends transversely centrally beneath female plate 36 and may be journaled in the side members 33. Beneath each reset shaft 50, cam shaft 204 may carry a cam member 206 fixed to shaft 204 and presenting a cam edge face 207 to a cam follower 208 carried in the bottom bifurcated end of reset shaft 50. Each edge face 207 includes a curved cam face 209 of slightly greater than a semicircle and a flat cam face 210 continuous with curved face 209. As best seen in FIGS. 7 and 8, when the handle 25 is in starting position (directed toward the right of FIG. 7) the cam follower 208 engages the cam face 209 adjacent one end thereof. As shaft 204 and cam member 206 are turned, the cam follower travels along substantially the entire length of the curved cam face 209 and ultimately is positioned at approximately the center of the flat cam face 210, as shown in FIG. 8. The sequence of operations performed between these two positions will now be described.

*Card Transport Drive Means*

Means for driving the card transport means is best seen in FIGS. 1 and 2. In FIG. 1 the drive gear 202 meshes on the side opposite from pinion gear 203 with a relatively small diameter transfer gear 212 which meshes with a similar small gear 213, said gears 212 and 213 being supported between the side member 33 and wall 201. Gear 213 is carried on a shaft 214 which may carry at its inner end a sprocket 215 which carries one end of a sprocket chain 216. At its other end, chain 216 may be supported from a sprocket 217 mounted on a stub shaft 218 supported from wall 156. Chain 216 is looped beneath a drive sprocket 220 which is carried on an extension of shaft 164 of the pair of friction wheels 163. Shaft 164 carries a gear 223 meshed with a gear 224 on upper shaft 222 which carries wheels 145. The opposite end of shaft 222 may be extended beyond adjacent wheel 145 and may carry at its end a sprocket 226 carrying one end of a chain 227 which may be carried at its other end by a sprocket 228 carried on shaft 229 upon which the friction wheels 146 are mounted. Thus the pairs of friction wheels 145 and 146 for propelling card 22 are driven by movement of the crank handle 25 in synchronism.

*Sales Slip Drive Means*

Means for propelling the sales slip 21 are provided by the gear 223 carried at the end of shaft 164 which carries the spaced friction wheels 163, said friction wheels 163 and friction wheels 145 being driven at the same rate of speed since gears 223 and 224 may have a one-to-one ratio. Friction wheels 169, which also serve to propel the sales slip as it is inclined downwardly along its path after separation from the credit card 22, may include the looping of chain 216 over an idle sprocket 231 carried by wall 156 and providing an extension on shaft 170 for carrying a sprocket 232 in engagement with chain 216 between idle sprocket 231 and end sprocket 215. Final positioning of the sales slip 21 is accomplished by the friction wheels 171 which are carried on shaft 173 and driven by rotation of the cam shaft transmitted thereto by a sprocket 234 (FIG. 8) carried on shaft 173, said sprocket 234 being connected by a chain 235 to an enlarged sprocket 236 fixed to shaft 204 and rotatable therewith. The ratio between sprockets 234 and 236 is such that the sales slip will be positively driven by the friction wheels 171 into its selected position for a punching operation.

The printing roller 176 may be driven in synchronism with the drive wheels 145 by extending shaft 238 upon which the roller 176 is mounted and providing a sprocket 239 in meshed engagement with chain 227. Inking roller 177 need not be driven.

Ejection of sales slip 21 and credit card 22 from punching position is accomplished by moving the crank handle 25 from its final punch position to its normal position, as shown in FIG. 1. As the crank handle 25 is moved toward the rear of device 20 the system of gears, chains and sprockets above described are moved substantially in reverse, the sales slip 21 being urged toward the front of the device by the friction wheels 171 until the friction wheels 169 engage the sales slip and further propel the sales slip past the printing roller 177 and by friction wheels 163 until the leading edge of the sales slip is again presented at the opening 153 at the front of the device. From a consideration of FIGS. 7 and 8 it will be noted that credit card 22 in its final position has a front edge portion still in engagement with the friction wheels 146. Thus, as the cycle is reversed, the friction wheels 146 propel the credit card toward the front of the device until it engages the friction wheels 145 which then further propel the credit card into the opening defined by walls 140 and 141 and above the sales slip. The sales slip and credit card move substantially simultaneously in the ejection thereof and are presented at the front of the device for convenient removal by the clerk.

*Lock Actuating Means*

Means to actuate the lock means for the punch elements when they are in punch position and at a selected point in the cycle of the punching operation is best shown in FIGS. 14 and 15. The rear edge portion of lock plate 132 may be provided with an opening 241 through which may extend an upstanding vertical link 242 pivotally and slideably connected at 243 to a link 244 extending forwardly beneath female plate 36 and provided with a downwardly-facing hook or recess 245 at its end positioned over cam shaft 204. The link 242 may be pivotally and vertically slideably connected by a slot and pin means 246 to a bracket 247 carried by male plate 37. Link 244 may be similarly provided with a pin and slot connection at 248 with a bracket 249 carried by female plate 36. A coil spring 250 connected at its back end to the link 242 as at 251 normally biases the link 242 forwardly (unlocked position) said spring means 250 having its opposite end connected as at 252 to a depending lug carried by the female plate 36. The notch 245 on link 244 engages a pin 253 carried by a freely rotatable disk 254 mounted on shaft 204 and provided with an arcuate slot 255 which slideably receives a pin 256. A spring means 257 interconnects the pin 253 and pin 256 and normally biases the pins toward each other. The pin 256 is carried by a disk 258 which is fixed to shaft 204 and which may rotate therewith.

The locking means for plate 132 is actuated at a selected point in the cycle of rotation of shaft 204 as determined by the relative position of pin 256 with respect to the pin 253, which in normal starting position will be at the upper end of the slot 255 (FIG. 14). As the disk 258 is rotated the pin 256 will move to the end of slot 255 and commence to turn the free disk 254 and thus cause movement of the pin 253 fixed thereto so as to move link 244 rearwardly and cause relative pivotal movement between links 244 and 242 so that the lock plate 132 is moved rearwardly a slight distance to thereby cause the locking plate 132 to engage the locking face 137 on the punch element 27. The amount of distance that the locking plate 132 moves may be in the range of .020".

The locking plate 132 is released when the crank handle is moved in reverse direction, and in order to provide for the prompt immediate release of locking plate 132, slot 255 in the free disk 254 permits immediate movement of the pin 256 in the reverse direction while the spring 250 causes the link 242 to return immediately to its unlocked position. It will be apparent that spring 257 with its biasing force tends to urge the pin 256 toward pin 253 while maintaining engagement of the latter pin in the notch 245 and the pin and slot connection 248 of link 244 allows free movement of the link 244 as it is biased forwardly by the spring 250.

*Toggle Means*

Toggle means for releasing the male punch plate 37 after the punch elements 27 are in locked position by the locking plate 132 are best seen in FIGS. 6, 9, 10 and 11. Referring first to FIGS. 6 and 9, the toggle means generally indicated at 260 are shown in toggle lock or set position. The toggle means may comprise a toggle link 261 pivotally mounted on a pin 262 fixed to a depending angle bracket 263 secured to male plate 37. The lower end of link 261 is pivotally connected, as at 264, to a toggle link 265 having a hub portion 266 mounted for rotation on shaft 204.

In toggle locked position, as shown in FIG. 9, the links 261 and 265 have their longitudinal axes approximately aligned but slightly off-center at the pivotal connection 264. A toggle lock member 267 for holding the links 261 and 265 in such off-center position may comprise a spacer sleeve 268 sleeved over pin 262 and provided with a toggle locking or positioning lug 269 which abuts and contacts an edge of link 261 to limit movement of link 261 in one direction and to hold links 261, 265 in off-center position. The toggle lock member 267 includes a depending portion 270 provided with a contact face 271 adapted to be engaged by a contact release lug 272 carried by a toggle release member 273 fixedly mounted on shaft 204 in adjacent relation to the hub portion 266 of link 265. The toggle lock member 267 is biased and normally positioned in vertical position by a spring 274 having one end 275 engaged in a port in toggle lock member 267 below the toggle lock lug 269 and its other end 276 received within a hole in the end of the fixed pin 262. Thus, at a selected point in the rotation of cam shaft 204 and after the locking plate 132 has locked the punch elements the contact pin 272 is rotated by the shaft 204 into contact with the face 271, causing the toggle lock member to give slightly to permit the pivotal connection 264 to be moved off-center and to permit the toggle link members 261 and 265 to collapse, as shown in FIG. 10. Upon such collapse of the toggle link members, it will be clear that the male plate 37 carrying the selected punch elements, will be released for downward movement for the punching operation.

*Operation*

In operation of the device 20, a credit card 22 having the desired coded information thereon, and a sales slip 21 to which it is desired to transfer such coded information for convenient handling by selected business machines, may be positioned at the front of the device, as shown in FIG. 1. Upon insertion of card 22 and sales slip 21 sufficiently into and through openings 142, 142b to engage leading edges thereof with friction wheels 145 and 163, movement of crank handle 25 from its rear position, as shown in FIG. 1, forwardly and toward the operator, will cause the following sequence of operations. As crank handle 25 begins its movement toward the front of the device the card transport means simultaneously advances the card and sales slip with opposed faces in meeting engagement, past the friction wheels 145 and 163 and beneath the roll 176 and above the ink or printing roll 177. As the card and slip are passed through the printing means the printing roller 177 prints the embossed information on the credit card onto the sales slip. The credit card then advances in a horizontal plane, is engaged by friction wheels 146 and is driven into position on wall 101 between the information-responsive means 26 and the punching means 28. As it is propelled into final oriented position, the credit card is driven against the stop 105 provided on said wall 101 and is also driven sidewise by the cocked arrangement of the wheels 146 against the edge or bottom wall of the recess 107. Simultaneously, the sales slip 21 is guided by guide grooves into a downwardly-inclined path, is engaged by the friction wheels 169 and is moved into its final position on the female plate 36 against stop 161 by the friction wheels 171 driven from the cam shaft 204. Thus, at a selected point in the movement of the crank handle 25 the credit card 22 and the sales slip 21 have been positioned in relation to each other and in relation to the punch device so that transfer of information may be accomplished.

Further movement of the crank handle 25 transmitted by the cam members 206 and reset shafts 50 will then cause actuation of the information-responsive means 26 so that the lower sensing plate 80 is lowered to permit the sensing pins 90 to pass through aligned openings in the credit card 22 or to be stopped by an opposed imperforate surface of said card 22. Sensing pins 90 which pass through ports in the credit card are urged downwardly into engagement with the top face of the aligned punching element 27 and as the sensing plate 80 moves farther downwardly the aligned punching element 27 is moved against frictional engagement of the friction means downwardly into a position as shown in FIG. 12b, such movement being limited by the recess 76 at the top end of each punch element 27. Selected fingers 125–129 are also lowered by plate 80 for contact with punch elements 27 therebelow to be moved into punch position. The punch elements 27 which have not been in contact with a sensing pin 90 or finger 125–129 are retained in non-punch position by the friction means in engagement with opposite sides thereof. Thus a selection of punch elements has been made in accordance with the coded information carried on the credit card 22 and the manual data selector means 29, and such punch elements have been urged into punch position.

Upon further movement of the crank handle 25, the punch lock means are actuated and plate 132 is moved rearwardly through the lock actuating means above described into locking engagement with the locking notches 136 provided at the bottom end of each punch element 27. It may be noted from a consideration of FIGS. 12 and 14 that the selected punch elements in punch position are firmly locked against upward relative movement, and the non-selected punch elements 27 are disposed above the lock plate 132 when it is in lock position. Thus the punch elements 27 in non-punch position are not inadvertently movable into punching position because the lock plate, as shown in FIG. 12c, would prevent the same.

With the punch elements in locked position, the male plate 37 and the selected punch elements are now in position for the punching operation. At this point in the cycle, the crank handle has been turned sufficiently so that the cam followers 208 are adjacent the juncture of the end of the curved cam faces 209 with the cam flat faces 210. As the cam followers begin to enter the flatted surfaces 210 it will be apparent that the relatively heavy springs 47 are restrained from drawing the male plate 37 downwardly by the reset shafts 50 and by the toggle means which are in locked position. The flat faces 210 of the members 206 provide space for the reset shafts 50 to move downwardly. A further increment of rotation of crank shaft 25 moves the release pin 272 against the abutment face 271 of the toggle lock member 267 which moves the toggle links 261 and 265 past center position and the toggle links collapse under the spring forces applied by springs 47 to the male plate 37. Thus the male punch plate 37 is forcibly snapped downwardly into and against the female plate 36 and the punch elements 27 in punch position are driven through the sales slip and partially into the aligned perforations in the female die insert plate 42. Thus, in a continuous movement of crank handle 25 a sequence of operations have been performed which result in the transfer of coded information from the credit card to a sales slip and in an arrangement having perforations of a shape, size, or form that may be used by modern business machines without further change or processing.

As the crank handle is returned to its initial position the sequence of operations are substantially reversed. The lock means for the punch elements is immediately released, as previously described, by the provision of biasing spring 250 and the immediate release of the pressure forces which urge pin 253 against the walls of the notch 245 on the end of the link 244. As the cam followers 208 move along the flat cam face 210 and onto the curved cam face 209 the reset shafts 50 are caused to move upwardly and when the male plate 37 has reached its normal position, as determined by collars 46, the toggle means will be snapped into position and locked by the biasing pin 274. Since the punch strip plate 38 is supported in spaced relation to male plate 37 by the lock washers 64, simultaneously as the two plates have moved upwardly as caused by the reset shafts 50, the punch strip elements 73 engage the strip face 78 of the punch elements in punch position and lift said punch elements out of engagement with the female plate 36 to return the selected punch elements to their normal position. It will be noted that the non-selected punch elements are engaged by strip elements 73 at the lower portion of recess 76 and that as the strip plate 38 moves upwardly relative to the male plate 37 the non-selected punch elements 27 are first held against movement with the strip plate by the friction means in engagement therewith on the male plate 37 so that the non-selected punch elements are ultimately positioned in the same normal relation as the elements which were in punch position.

The lower sensing plate 80 is also lifted by the reset shafts 50 into its normal position wherein the springs 84 are under compression and the springs 94 on each sensing pin are also under compression.

After the sensing pins 90 have been disengaged from the credit card 22 by return of the sensing plate 80 to its normal position, the credit card is free to be ejected from the device 20. It may also be noted that when the punch elements have been freed from the sales slip 21 the friction wheels 172 cause the sales slip to be ejected slightly prior to the release of the credit card.

In the modification of this invention shown in FIG. 16 only a fragmentary view of the punch device is shown, since the structure of the base, posts, punch means 28' including the female punch plate 36', male punch plate 37' and punch strip plate 38' may be similar in construction and operation. The information-responsive means 26' may include a similar sensing plate 81'. A lower sensing plate such as 82 is not required and means for supporting and positioning a card are not provided because the information to be transferred to the data storage or record means is being fed to the device from a source other than the card. Instead of a plurality of pins 90 carried thereby a plurality of pins 90' in the form of flexible wire cable are provided, said pins 90' being connected at their opposite ends to movable armatures of a plurality of solenoid means 300.

In this modification the invention contemplates that the solenoid means 300 will be responsive to and may be actuated by various types of electronic data processing and handling machines so that the information which is to be transferred to a sales slip 21' or to a data storage means may be fed to the punch device of this invention through such solenoid means and the punch elements 27' actuated by the selection of such pins 90 from information transmitted through the electronic data handling devices. The actuating means (not shown) for operation of the punch device 20' may comprise suitable means for reciprocally turning cam shaft 204 or, if desired, by rotating shaft 204 to provide a selected cycle or sequence of operations.

It is important to note that in the modification shown in FIG. 16 each punch element 27' is frictionally held in position by friction means 60'.

It will be understood by those skilled in the art that the manner of retaining the punch elements in non-punch position or in punch position, and the manner in which they are moved to and from punch position provides advantages in operation which facilitate the transfer of coded information on a credit card (or provided in other forms) to a sales slip, business record form or data storage form. It is important to note that punch elements 27 which are not selected are retained in non-selected position by friction means during operation of the device. Moreover, it is important to note that the friction means employed has long life and permits frequent repeated movement of the pins 27 without substantial wear of said pins. While the description has emphasized the use of friction means to position the punch elements 27, the invention also contemplates that the punch elements 27 may be magnetized and held in position by magnetic forces so that the punch elements 27 will operate and function in the same manner as those held by friction means.

It should also be noted that while a single cam shaft is employed to actuate and cause the cycle of operations and a single crank handle is attached to said shaft and movable through greater than 90° but less than 180°, that a single cam shaft may be employed in which the angular extent of the movement of the cam shaft and crank handle may be greater than 180° or even less than 90°. The invention contemplates that the selection of punch elements may be made by relative movement of the punch elements with respect to a punch element sensing means by other suitable constructions.

It will thus be apparent to those skilled in the art that coded information on a credit card or the like is readily transferred to and made physically a part of a record means in such a manner that the record means can be read by well known data processing machines, such as IBM, without further change. Thus, the rectangular punch holes in the sales slip are accurately spaced, accurately dimensioned, and precised punched so as to be within tolerances (.005 in.) required by such business machines for handling such information. The punch elements selected and used in punching from the arrangement of coded holes in the credit card provide true, accurate and foolproof transfer of information; tampering with the location and orientation of either the card or sales slip will result in punched holes beyond the tolerances permitted by the machine reading the information on the record means or sales slip and the machine will not read the punched information.

It will thus be apparent that a credit card made of a hard, relatively stiff material may have holes, perforations, openings and the like formed therein of a different shape and configuration than those required on an accounting card, sales slip, or data record means for use in a data processing machine. Moreover the arrangement of such holes may be such to permit greater or any area on the sales slip to be available to receive information.

It will be understood that all changes or modifications of the punch device described above which come within the spirit of this invention and which come within the scope of the appended claims are embraced thereby.

I claim:

1. In a device for transferring information from a card to a sales slip, the combination of: a frame means including a plurality of spaced upstanding posts; punch means carried by the frame means and including a perforated female plate retained against movement on said posts, a perforated male plate slideably movable on said posts and carried in spaced relation to said female plate, perforations in said male plate and female plate being aligned; a punch strip plate slideably carried on said posts and spaced above said male plate, a plurality of punch elements supported for limited movement by said punch strip plate and extending into aligned perforations on said male plate, friction means carried by said male plate for frictional engagement with each punch element for holding the punch elements against movement; means responsive to information carried by a card and including a movable sensing pin aligned with each punch element; and actuating means on the frame means and including an actuating shaft extending beneath the female plate, reset shaft means in cooperable engagement with said punch means and said information-responsive means, and cam means interconnecting said actuating shaft and said reset shaft means; and means for simultaneously positioning an information-bearing card in cooperable relation to said responsive means and a sales slip in position to be punched by said punch means.

2. A device as stated in claim 1, including means connected with said card and sales slip positioning means and with said actuating shaft for moving the card and sales slip into and out of operable relation with the responsive means and punch means respectively.

3. A device as stated in claim 1, wherein said information-responsive means includes upper and lower sensing plates carried by said posts and biased apart, said lower plate being positioned by said reset shaft means, said sensing pins extending through aligned perforations on said upper and lower sensing plates and being normally biased against said lower plate.

4. A device as stated in claim 1, including lock means for said punch elements carried by said male plate, and means connecting said lock means with said actuating shaft for actuation of said lock means.

5. A device for transferring information provided in code form to a record means comprising, in combination: a frame means including a plurality of spaced upstanding posts; punch means supported on said frame means and including a fixed female plate, a male plate spaced above said female plate and slideably movable on said posts, said female and male plates having aligned perforations therein, a punch strip plate above said male plate and slideably supported on said posts, a plurality of punch elements carried by said punch strip plate and extending into respective aligned perforations on said male plate, friction means on said male plate for frictionally grasping each punch element against movement relative thereto for retaining a punch element in a selected position; means responsive to the information provided in code form and including movably mounted pins aligned with respective punch elements for selective contact therewith in accordance with said information, actuating means for moving said male plate and selected punch elements relative to said female plate; and means for positioning a record means for punching by selected punch elements.

6. In a punch device for use in transferring coded information to a record, the combination of: means for positioning a record to which information is to be transferred; punch means disposed adjacent said record-positioning means, said punch means including a plurality of punch elements adapted to be moved into punch and non-punch positions, and means for holding and frictionally grasping said punch elements beween their ends in the selected position; means responsive to said coded information and movable into engagement with punch elements to be selected in accordance with the coded information; means for locking selected punch elements in punch position; and means for simultaneously moving said selected punch elements into punching engagement with the record.

7. A punch device as stated in claim 6 wherein said means for holding said punch elements includes parallel strips of friction material in frictional gripping engagement with opposite side faces of each punch element.

8. A machine for transferring coded information carried by a perforated credit card or the like to an imperforate record form or the like comprising: a plurality of longitudinally movable punches; means supporting said punches between said credit card and record form and including frictional means gripping said punches between their ends; means on the opposite side of said credit card for selecting through coded information on said credit card corresponding punches below said card; said frictional means holding said selected punches in punch position; means for locking said selected punches in punch position; and means for simultaneously moving all of said selected punches downwardly toward said record form whereby said selected punches in punch position may perforate said record form in accordance with the coded information carried on the perforated credit card.

9. In a punch machine for transferring coded information to a record means, the combination of: a plurality of independent elongated punch elements; means to hold said plurality of punch elements in one position in a planar zone and including friction means gripping each punch element between its ends; means at one side of said zone to move only selected punch elements into punching position by longitudinally displacing said punch elements against the gripping engagement of said friction means while non-selected punch elements remain undisturbed in the grip of their associated friction means; and means including a strip plate at said zone engageable with each selected punch element to return such element to said one position.

10. In a punch machine for transferring information in the form of a selected arrangement of holes in a card to a record means with transferred information being in the form of preselected perforations dimensionally precise in size, shape, and spacing, the combination of: means including a plurality of punch elements for cutting said perforations in a record means; said punch elements being positionable into punch and non-punch positions; means including frictional material for normally grasping, supporting, and holding said punch elements between their ends against movement in both punch and non-punch position; and means responsive to information to be transferred for activating punch elements to punch position.

11. In a device for transferring information from a card to a sales slip, the combination of: means including a plurality of punch elements for cutting perforations in a sales slip, means for transporting a card and a sales slip along a common path and then into divergent paths and then into operative positions on opposite sides of said plurality of punch elements; means for activating punch elements to punch position in accordance with information carried by said card; means for normally holding said punch elements against movement out of punch and non-punch position; means for locking punch elements in punch position; means for moving said punch elements in punch position into cutting engagements with said sales slip and to return said elements to non-punch position; and means for ejecting said card and sales slip after said punch elements are returned to non-punch position.

12. In combination with a punch machine having punch members movable between punch and non-punch position for transferring information from a data bearing card to a record means, the provision of: means comprising resilient frictional material supported in frictional gripping engagement with said punch members between their ends.

13. In combination with a punch machine having punch members movable between punch and non-punch position for transferring information from a data bearing card of a record means, the provision of: resilient frictional means supported between said punch members and having frictional engagement with longitudinal surfaces on said punch members to normally restrain said members against longitudinal movement while permitting longitudinal movement when a punch member is selected for punching.

14. In combination with a device having a plurality of punch members arranged in a punch member zone and movable between punch and non-punch position and for transfer of information from a data bearing card to a record means, the provision of: means for initially receiving a card and a record form in adjacent relation; means on one side of said punch member zone to locate and position said card; means on the opposite side of said punch member zone to locate and position said record form; and means for moving said card and form to their above said respective positions on opposite sides of said zone.

15. In the combination as stated in claim 14 wherein said means for moving said card and form to their respective positions on opposite sides of the zone includes means forming a common path for said card and form and means forming diverging paths for said card and form.

16. In the combination with a device as stated in claim 14 including printing means cooperable with said card and form and located between said receiving means and said zone.

17. In combination with the device as stated in claim 15 including printing means cooperable with said card and form, said printing means being located along said means forming the common path for said card and form.

18. In a device for transferring information from a data bearing card to a record form including a frame means supporting punch means which includes a stationary perforated female plate, a movable perforated male plate in operable alignment with the female plate, a plurality of punch elements supported for limited movement in relation to said male plate and extending into perforations on the male plate; means responsive to information carried by a card; and actuating means on the frame means and including an actuating shaft extending in operable relation with respect to said punch means; the provision of: a strip plate supporting said punch elements, reset shaft means carried by said frame means and cooperable with said actuating shaft and said strip plate for moving punch elements to non-punch position; and frictional gripping means in engagement with each of said punch elements between its ends for frictionally resisting movement of said punch elements relative thereto and normally maintaining said punch elements in their selected position.

19. In a device for transferring information from a data bearing card to a record form including a frame means supporting punch means which includes a stationary perforated female plate, a movable perforated male plate in operable alignment with the female plate, a plurality of punch elements supported for limited movement in relation to said male plate and extending into perforations on the male plate; means including a sensing plate carrying sensing elements responsive to information carried by a card; and actuating means on the frame means and including an actuating shaft extending in operable relation with respect to said punch means; the provision of: reset shaft means having cam engagement with said actuating shaft and having supporting engagement with said male plate and sensing plate during a punching operation.

20. In a device for transferring information from a card to a sales slip, the combination of: a frame means; punch means carried by the frame means and including a plurality of punch elements supported for limited longitudinal movement and defining a punch element zone; means at one side of said punch zone responsive to information carried by a card and including a movable sensing pin aligned with each punch element; positioning means for said card between said responsive means and said punch member zone; positioning means at the opposite side of said zone for a sales slip; actuating means on the frame means including an actuating shaft; and transport means for said card and said sales slip actuated by said actuating means for moving said card and said sales slip into cooperable relation with their respective positioning means on opposite sides of said punch member zone.

21. A device as stated in claim 20 wherein said transport means includes means for simultaneously moving said card and said sales slip along a common path and then into diverging paths for respectively introducing said card and sales slip into their respective positioning means.

22. In a device as stated in claim 21 including printing means carried by said frame means at said means forming said common path.

23. In a punch machine for transferring coded information to a record means, the combination of: a plurality of independent elongated punch elements; means to hold said plurality of punch elements in one position in a planar zone and including friction means gripping each punch element between its ends; means at one side of said zone to move only select punch elements into punching position by longitudinally displacing said punch elements against the gripping engagement of said friction means while non-selected punch elements remain undisturbed in the grip of their associated friction means; means at said zone engageable with each selected punch element to return such element to said one position; each punch element including an elongated member having an elongated first recess in one edge adjacent one end thereof and a second recess adjacent the opposite end in the same edge, one of the walls of said first recess affording a stripping face for positive return of said punch element to said one position, and said second recess affording a wall surface adapted to cooperate with a locking face on a means for holding said punch element in said punching position.

24. In a device for transferring information from a data bearing card to a record form including a frame means supporting punch means which includes a stationary perforated female plate, a movable perforated male plate in operable alignment with the female plate, a plurality of punch elements supported for limited movement in relation to said male plate and extending into perforations on the male plate; means responsive to information carried by a card; and actuating means on the frame means and including an actuating shaft extending in operable relation with respect to said punch means; the provision of: reset shaft means cooperable with said actuating shaft and having cooperable engagement with said punch means during a punching operation, said reset shaft means extending through said female plate, said reset shaft means having a supporting connection to said male plate.

References Cited in the file of this patent

UNITED STATES PATENTS

| | | |
|---|---|---|
| 1,650,937 | Einstein | Nov. 29, 1927 |
| 1,788,694 | Thomas | Jan. 13, 1931 |
| 2,792,891 | Johnson | May 21, 1957 |
| 2,909,221 | Hopp | Oct. 20, 1959 |
| 3,037,688 | Smith | June 5, 1962 |